US012675023B2

(12) United States Patent
Yoshida et al.

(10) Patent No.: US 12,675,023 B2
(45) Date of Patent: ***Jul. 7, 2026

(54) VARIABLE FOCAL LENGTH LENS DEVICE AND VARIABLE FOCAL LENGTH LENS CONTROL METHOD

(71) Applicant: MITUTOYO CORPORATION, Kanagawa (JP)

(72) Inventors: Satoru Yoshida, Kanagawa (JP); Yuki Kurahashi, Tokyo (JP); Koji Kubo, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 300 days.

This patent is subject to a terminal disclaimer.

(21) Appl. No.: 18/395,812

(22) Filed: Dec. 26, 2023

(65) Prior Publication Data

US 2024/0210601 A1 Jun. 27, 2024

(30) Foreign Application Priority Data

Dec. 27, 2022 (JP) ................................. 2022-210179

(51) Int. Cl.
| | |
|---|---|
| *G02F 1/29* | (2006.01) |
| *G02B 3/14* | (2006.01) |
| *G02B 30/27* | (2020.01) |
| *G02B 26/00* | (2006.01) |

(52) U.S. Cl.
CPC ............. *G02F 1/294* (2021.01); *G02B 30/27* (2020.01); *G02F 1/292* (2013.01); *G02B 3/14* (2013.01); *G02B 26/005* (2013.01); *G02F 2203/15* (2013.01)

(58) Field of Classification Search
USPC ......................................................... 359/315
See application file for complete search history.

(56) References Cited

U.S. PATENT DOCUMENTS

| | | |
|---|---|---|
| 10,503,044 B1 | 12/2019 | Watanabe et al. |
| 10,642,017 B2 | 5/2020 | Cha et al. |
| 10,663,629 B2 | 5/2020 | Nagahama et al. |
| 10,705,263 B2 | 7/2020 | Usami et al. |

(Continued)

FOREIGN PATENT DOCUMENTS

JP 2018-189700 A 11/2018

*Primary Examiner* — Dung T Nguyen
(74) *Attorney, Agent, or Firm* — Greenblum & Bernstein, P.L.C.

(57) ABSTRACT

A variable focal length lens device includes: a liquid resonant liquid lens unit having a refractive index changeable in response to an inputted drive signal; a scanning range setter setting a predetermined standard frequency band as a scanning range of a frequency of the drive signal; a resonance frequency detector scanning the frequency of the drive signal over the scanning range and detecting a resonance frequency of the liquid lens unit based on an oscillation state of the liquid lens unit; and a resonance frequency estimator calculating an estimated value of a target resonance frequency based on a standard resonance frequency detected from the standard frequency band by the resonance frequency detector, the scanning range setter further setting a target frequency band including the estimated value of the target resonance frequency as the scanning range.

5 Claims, 7 Drawing Sheets

(56)     References Cited

U.S. PATENT DOCUMENTS

| | | | |
|---|---|---|---|
| 10,816,755 B2 | 10/2020 | Sakai et al. | |
| 10,845,580 B2 | 11/2020 | Igasaki et al. | |
| 10,908,398 B2 | 2/2021 | Igasaki et al. | |
| 10,915,000 B2 | 2/2021 | Sakai | |
| 10,986,263 B2 | 4/2021 | Sakai et al. | |
| 11,022,727 B2 | 6/2021 | Igasaki et al. | |
| 11,193,757 B2 | 12/2021 | Yoshida et al. | |
| 11,215,739 B2 | 1/2022 | Igasaki et al. | |
| 11,215,788 B2 | 1/2022 | Sakai et al. | |
| 11,237,354 B2 | 2/2022 | Nagahama et al. | |
| 11,474,285 B2 * | 10/2022 | Igasaki | G02B 26/004 |
| 11,525,978 B2 | 12/2022 | Kubo | |
| 11,543,642 B2 | 1/2023 | Kurahashi | |

* cited by examiner

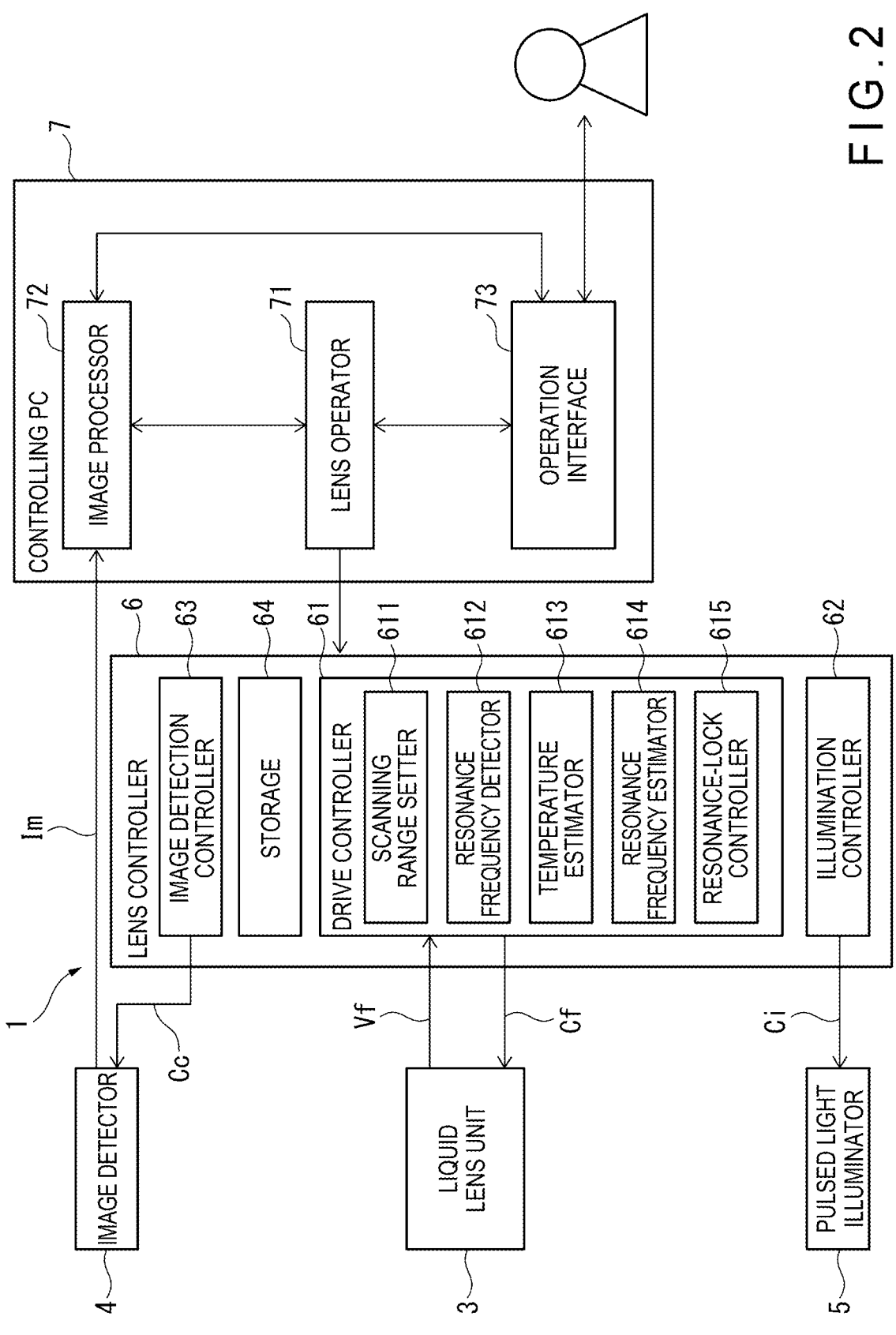
F I G . 2

F I G . 4
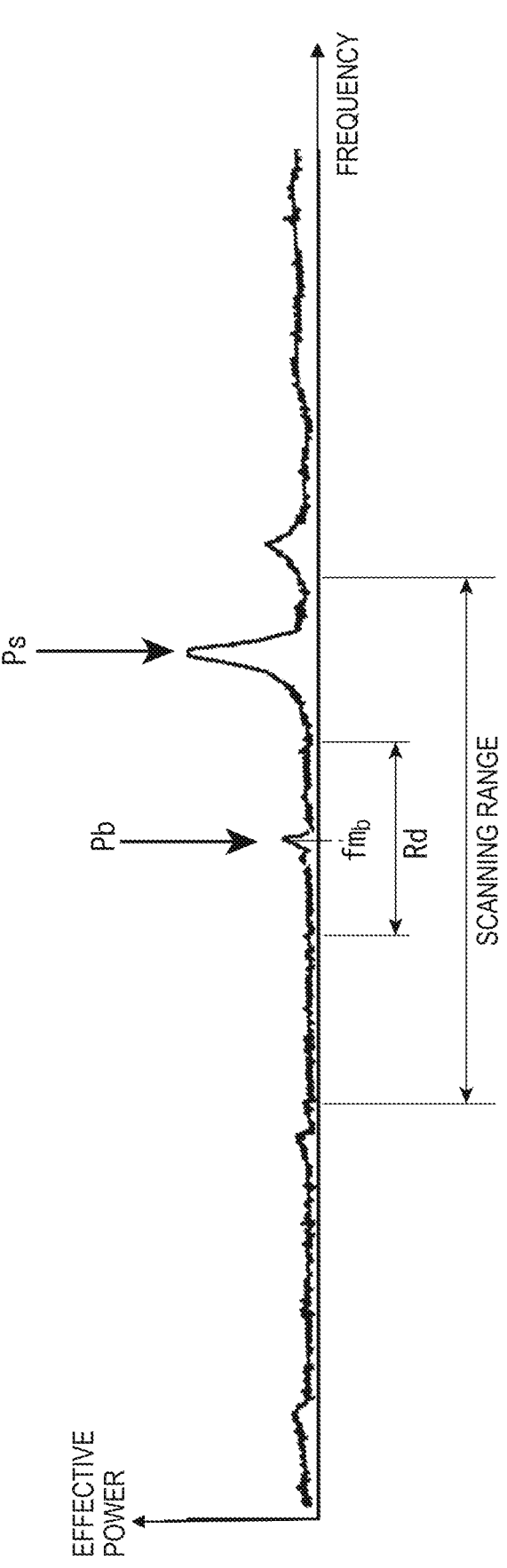

VARIABLE FOCAL LENGTH LENS DEVICE AND VARIABLE FOCAL LENGTH LENS CONTROL METHOD

CROSS REFERENCE TO RELATED APPLICATIONS

The entire disclosure of Japanese Patent Application No. 2022-210179 filed Dec. 27, 2022 is expressly incorporated by reference herein.

TECHNICAL FIELD

The present invention relates to a variable focal length lens device and a variable focal length lens control method.

BACKGROUND ART

There is conventionally known a variable focal length lens device including a liquid resonant liquid lens unit (for instance, see Patent Literature 1: JP 2018-189700 A). In the variable focal length lens device, a drive signal with a high frequency of approximately several hundreds KHz at a maximum is inputted to the liquid lens unit to oscillate a piezoelectric element disposed in a container of the liquid lens unit, causing an internal fluid to resonate to form concentric standing waves with different refractive indexes. This makes it possible to periodically change a focal length at a high speed corresponding to a resonance frequency.

In the above variable focal length lens device, a temperature of a liquid or the like in the liquid lens unit changes due to the effect of outside temperature, heat caused by operation, or the like, which changes the frequency of the drive signal that allows the standing waves to be obtained (i.e., the resonance frequency of the liquid lens unit). A variable focal length lens device of Patent Literature 1 thus performs a detection process to detect a resonance frequency of a liquid lens unit when starting the drive of the liquid lens unit. In the detection process, a frequency of a drive signal is scanned over a predetermined scanning range and a frequency at which an oscillation state of the liquid lens unit peaks is detected as the resonance frequency of the liquid lens unit. The oscillation state of the liquid lens unit is detectable in accordance with an effective power, a voltage, or a current supplied to the liquid lens unit, a voltage-current phase difference, or the like.

In the above variable focal length lens device of Patent Literature 1, a wide scanning range of the frequency of the drive signal is secured in consideration of a change in resonance frequency of the liquid lens unit. However, if an extra wide scanning range of the frequency of the drive signal is secured, a target resonance frequency would be difficult to detect. For instance, in a case where the oscillation state of the liquid lens unit spuriously peaks at a frequency other than the resonance frequency in the scanning range or in a case where a resonance frequency with a non-target order is included in the scanning range, the target resonance frequency is difficult to detect.

SUMMARY OF THE INVENTION

An object of the invention is to provide a variable focal length lens device and a variable focal length lens control method capable of reliably detecting a target resonance frequency.

A variable focal length lens device according to an aspect of the invention includes: a liquid resonant liquid lens unit having a refractive index changeable in response to an inputted drive signal; a scanning range setter configured to set a predetermined standard frequency band as a scanning range of a frequency of the drive signal; a resonance frequency detector configured to cause the frequency of the drive signal to be scanned over the scanning range and detect a resonance frequency of the liquid lens unit based on an oscillation state of the liquid lens unit; and a resonance frequency estimator configured to calculate an estimated value of a target resonance frequency of the liquid lens unit based on a standard resonance frequency that is a resonance frequency detected from the standard frequency band by the resonance frequency detector, in which the scanning range setter is configured to further set a target frequency band including the estimated value of the target resonance frequency as the scanning range.

In detecting a target resonance frequency of the liquid lens unit with such a configuration, a target frequency band including an estimated value of the target resonance frequency can be set as a scanning range of a frequency of the drive signal. This makes it possible to reliably detect the target resonance frequency from the scanning range without securing a large width of the scanning range for detecting the target resonance frequency.

In the variable focal length lens device according to the aspect of the invention, a width of the target frequency band is preferably narrower than a width of the standard frequency band.

Such a configuration makes it possible to favorably achieve reliably detecting the standard resonance frequency by securing the wide standard frequency band and setting the target frequency band in a range including no frequency at which a spurious peak or the like appears by narrowing the target frequency band.

In the variable focal length lens device according to the aspect of the invention, a width of the target frequency band is preferably one quarter as large as or smaller than a resonance frequency interval of the liquid lens unit corresponding to a standard temperature.

A variable focal length lens control method according to another aspect of the invention, the method being applicable to a variable focal length lens device including a liquid resonant liquid lens unit having a refractive index changeable in response to an inputted drive signal, the method including: (a) causing a frequency of the drive signal to be scanned over a predetermined standard frequency band and detecting a standard resonance frequency of the liquid lens unit based on an oscillation state of the liquid lens unit; (b) calculating an estimated value of a target resonance frequency of the liquid lens unit based on the standard resonance frequency detected in the (a); and (c) causing the frequency of the drive signal to be scanned over a target frequency band including the estimated value of the target resonance frequency estimated in the (b) and detecting the target resonance frequency of the liquid lens unit based on an oscillation state of the liquid lens unit.

Such a method provides an effect similar to that of the variable focal length lens device according to the above aspect of the invention.

In the variable focal length lens control method according to the aspect of the invention, a scanning pitch of the frequency of the drive signal in the step (a) is preferably larger than a scanning pitch of the frequency of the drive signal in the step (c).

With such a method, it is possible to shorten time required for the step (a) by setting the scanning pitch in the step (a)

large and detect the target resonance frequency with high accuracy by setting the scanning pitch in the step (c) small.

BRIEF DESCRIPTION OF DRAWINGS

FIG. 2 is a block diagram illustrating a control system of the variable focal length lens device of the exemplary embodiment;

FIG. 4 is a graph illustrating, by way of example, a change in effective power of the liquid lens unit relative to a frequency of the drive signal in a target frequency band (a high frequency band);

DETAILED DESCRIPTION

Figure 1:
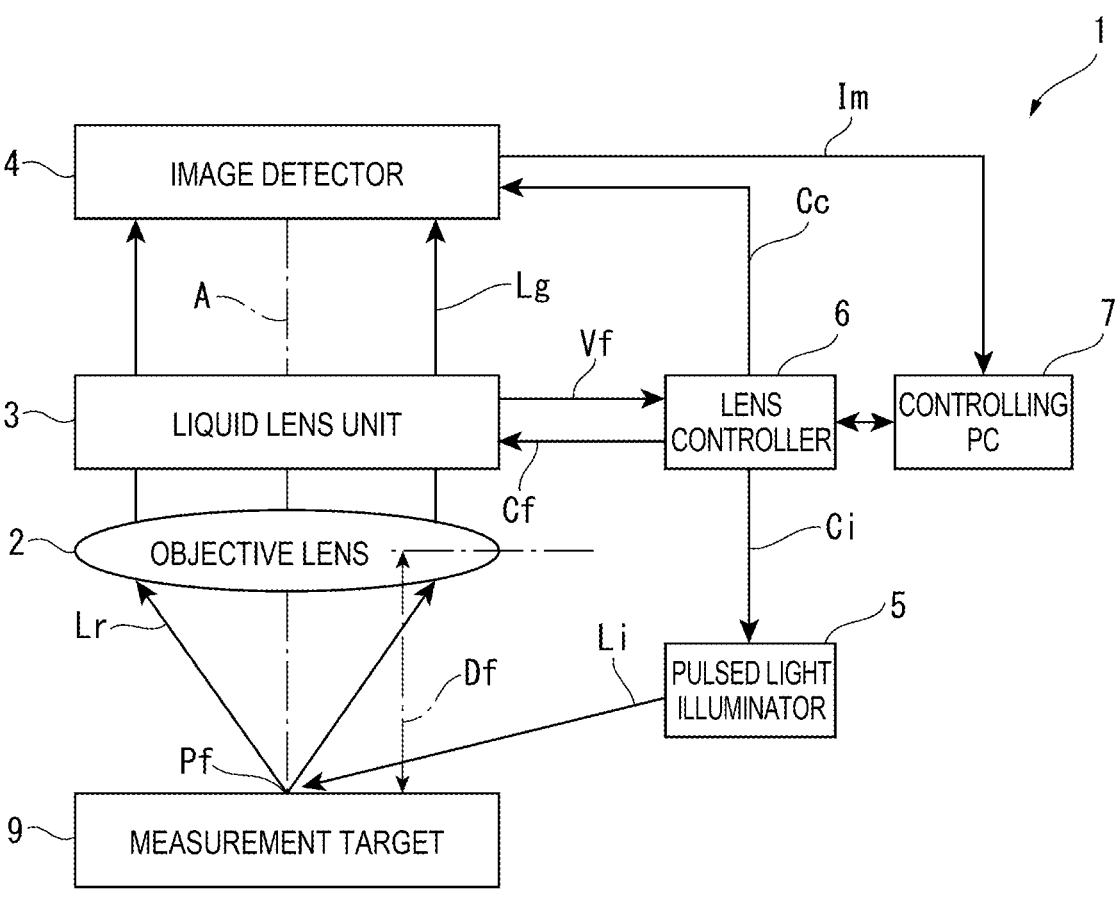
FIG. 1 schematically illustrates a variable focal length lens device of an exemplary embodiment of the invention.

Referring to the drawings, description will be made on an exemplary embodiment of the invention.

FIG. 1 illustrates an overall configuration of a variable focal length lens device 1 of the exemplary embodiment. The variable focal length lens device 1 of the exemplary embodiment detects an image Lg of a surface of a measurement target 9 placed in an imaging region while periodically changing a focal length Df to a focal position Pf.

Configuration of Variable Focal Length Lens Device

As illustrated in FIG. 1, the variable focal length lens device 1 includes an objective lens 2, a liquid lens unit 3, and an image detector 4, which are located on an optical axis A intersecting with the surface of the measurement target 9, a pulsed light illuminator 5 that illuminates the surface of the measurement target 9 with a pulsed light, a lens controller 6 that controls operations of the liquid lens unit 3 and the like, and a controlling PC 7 for operating the lens controller 6.

The objective lens 2 includes an existing convex lens or a lens group.

The liquid lens unit 3, which is in a form of, for instance, a liquid resonant lens unit such as a variable acoustic gradient index of refraction lens (TAG lens), has a refractive index periodically changeable in response to a drive signal Cf inputted from the lens controller 6. The drive signal Cf is an alternating current signal in a form of a sinusoidal wave that causes an oscillation member of the liquid lens unit 3 to oscillate. When a frequency of the drive signal Cf is tuned to a resonance frequency fm of the liquid lens unit 3, a standing wave is generated in the liquid in the liquid lens unit 3, thereby causing cyclic variation in the refractive index of the liquid.

In the exemplary embodiment, the objective lens 2 and the liquid lens unit 3 provide a variable focal length lens. The focal length Df to the focal position Pf of the variable focal length lens is modulated depending on the refractive index of the liquid lens unit 3 on the basis of a focal length of the objective lens 2. This causes the focal length Df to vary, forming a focal-point-variation waveform in a form of a sinusoidal wave synchronized with the drive signal Cf.

The image detector 4, which includes an existing charge coupled device (CCD) image sensor, any other type of camera, or the like, is configured to receive an image Lg and output the image Lg to the controlling PC 7 in a form of a detected image Im of a predetermined signal format.

The pulsed light illuminator 5 includes a light emitting element such as a light emitting diode (LED). The pulsed light illuminator 5 emits an illumination light Li for a predetermined time to apply a pulsed illumination on the surface of the measurement target 9. A reflected light Lr reflected off the measurement target 9 forms the image Lg by the objective lens 2 and the liquid lens unit 3 to enter the image detector 4.

The lens controller 6 controls the drive of the liquid lens unit 3, the illumination of the pulsed light illuminator 5, and the image detection of the image detector 4. Specifically, as illustrated in FIG. 2, the lens controller 6 includes: a drive controller 61 that outputs the drive signal Cf to the liquid lens unit 3; an illumination controller 62 that outputs an illumination signal Ci to the pulsed light illuminator 5; an image detection controller 63 that outputs an image detection signal Cc to the image detector 4; and a storage 64 in which a variety of information is stored.

The drive controller 61, the illumination controller 62, and the image detection controller 63 may each be provided by a hardware using a plurality of ICs and the like, alternatively, may be provided mainly by a computer equipped with a CPU and the like through executing a program stored in the storage 64.

In addition to generating a resonance state of the liquid lens unit 3 by outputting the drive signal Cf to the liquid lens unit 3, the drive controller 61 detects an oscillation state Vf of the liquid lens unit 3 to control the drive signal Cf so that the liquid lens unit 3 has an expected resonance state.

It is only necessary for the drive controller 61 to detect, as the oscillation state Vf of the lens system, at least one of a drive voltage V, a drive current I, an effective power P, which are supplied to the liquid lens unit 3 via the drive signal Cf, or a voltage-current phase difference θ that is a phase difference between the drive voltage V and the drive current I. The effective power P is calculatable by Expression (1) below, where Ve denotes an effective value of the drive voltage V and Ie denotes an effective value of the drive current I.

$$P = Ve \cdot Ie \cdot \cos \theta \qquad \text{Expression (1)}$$

The drive controller 61 also functions as a scanning range setter 611, a resonance frequency detector 612, a temperature estimator 613, a resonance frequency estimator 614, and a resonance-lock controller 615 as described later.

The illumination controller 62 controls an illumination timing of the pulsed light illuminator 5 by the illumination signal Ci, and the image detection controller 63 controls an image detection timing performed by the image detector 4 by the image detection signal Cc. For instance, at a timing of the drive signal Cf reaching a predetermined phase, the illumination controller 62 causes the pulsed light illuminator 5 to illuminate the measurement target 9 with the pulsed light. During a plurality of cycles of the drive signal Cf, the image detection controller 63 causes the image detector 4 to detect an image. This makes it possible to obtain the detected image Im focused at the focal position Pf that corresponds to the predetermined phase of the drive signal Cf.

The storage 64 is a recording medium in which a variety of data is recorded. In the exemplary embodiment, as described later, the storage 64 stores a hard-to-detect order list including an order m of the resonance frequency fm that is difficult to detect by a basic detection method; a computing expression or a table to be used for the calculation of the resonance frequency fm of the liquid lens unit 3; and the like.

The controlling PC 7 includes an existing personal computer, and a desired function is achieved by executing predetermined controlling software thereon. For instance, the controlling PC 7 includes a lens operator 71 that performs an operation on the lens controller 6, such as the setting of image detection conditions, an image processor 72 that captures the detected image Im from the image detector 4 and applies a process to the detected image Im, and an operation interface 73 that receives a user operation on the variable focal length lens device 1.

Resonance Frequency of Liquid Lens Unit 3

In order to place the liquid lens unit 3 in a resonant mode of the target order m when starting the drive of the liquid lens unit 3, or the like, the variable focal length lens device 1 of the exemplary embodiment performs a process to detect the resonance frequency fm of the order m.

In the exemplary embodiment, a basic detection method for the resonance frequency fm is substantially similar to a conventional detection method for a resonance frequency. Specifically, it may be a method in which the frequency of the drive signal Cf is scanned over a predetermined scanning range and a frequency at which the oscillation state Vf of the liquid lens unit 3 (for instance, the effective power P of the liquid lens unit 3) shows a maximum value is detected as the resonance frequency fm. Here, the predetermined scanning range is a range set in advance for each order m through an experiment or simulation using the liquid lens unit 3. For instance, it is preferable that the predetermined scanning range include a resonance frequency of the liquid lens unit 3 corresponding to a standard temperature and have a width that is approximately half as large as a resonance frequency interval of the liquid lens unit 3 (an interval between adjacent resonance frequencies).

Further, the liquid lens unit 3 of the exemplary embodiment includes not only the resonance frequency fm detectable by the above basic detection method but also another resonance frequency fm difficult to detect by the method.

Specifically, with the liquid lens unit 3 of the exemplary embodiment, although the resonance frequency fm within a low frequency band (for instance, less than 100 KHz) is detectable by the basic detection method, the resonance frequency fm within a high frequency band (for instance, 100 to 300 KHz) is difficult to detect by the method.

Figure 3:
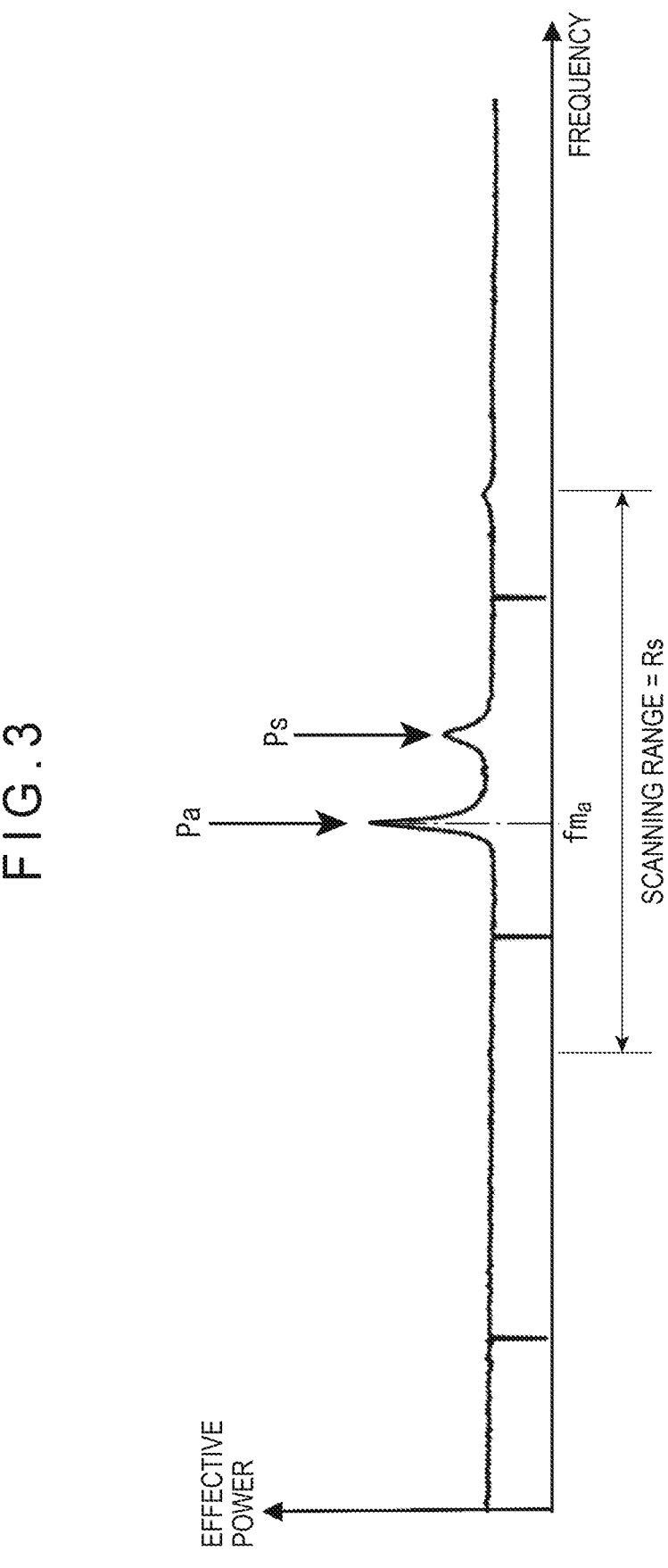
FIG. 3 is a graph illustrating, by way of example, a change in effective power of a liquid lens unit relative to a frequency of a drive signal in a standard frequency band (a low frequency band)

FIG. 3 is a graph illustrating, by way of example, a change in the effective power P of the liquid lens unit 3 relative to the frequency of the drive signal Cf, illustrating a low frequency band including a resonance frequency $fm_a$ of a relatively low order $m_a$ (for instance, $m_a=3$). As illustrated in FIG. 3, when the frequency of the drive signal Cf is the resonance frequency $fm_a$, the effective power P of the liquid lens unit 3 shows a maximum peak Pa. In this regard, the effective power of the liquid lens unit 3 may show a peak (a spurious peak Ps) even at a frequency other than the resonance frequency $fm_a$; however, a value of the spurious peak Ps is smaller than a value of the peak Pa corresponding to the resonance frequency $fm_a$. Thus, in a case where the basic detection method is performed, the frequency showing the maximum value (the peak Pa) within the predetermined scanning range can be detected as the resonance frequency $fm_a$.

FIG. 4 is a graph illustrating, by way of example, a change in the effective power P of the liquid lens unit 3 relative to the frequency of the drive signal Cf, illustrating a high frequency band including a resonance frequency $fm_b$ of a relatively high order $m_b$ (for instance, $m_b=6$). As illustrated in FIG. 4, when the frequency of the drive signal Cf is the resonance frequency $fm_b$, the effective power P of the liquid lens unit 3 shows a peak Pb. However, the effective power P of the liquid lens unit 3 shows a peak (a spurious peak Ps) even at a frequency other than the resonance frequency $fm_b$ and a value of the spurious peak Ps is larger than a value of the peak Pb corresponding to the resonance frequency $fm_b$. Thus, in a case where the basic detection method is performed, the frequency showing the maximum value (the spurious peak Ps) within the predetermined scanning range is detected as a resonance frequency, failing to detect the correct resonance frequency $fm_b$.

The spurious peak Ps as described above is speculated to occur due to not only the oscillation of liquid in the liquid lens unit 3 but also the oscillation of a housing structure housing the liquid; therefore, it is not possible to generate a standing wave in the liquid in the liquid lens unit 3 even by adjusting the frequency of the drive signal Cf to the frequency corresponding to the spurious peak Ps.

Figure 5:
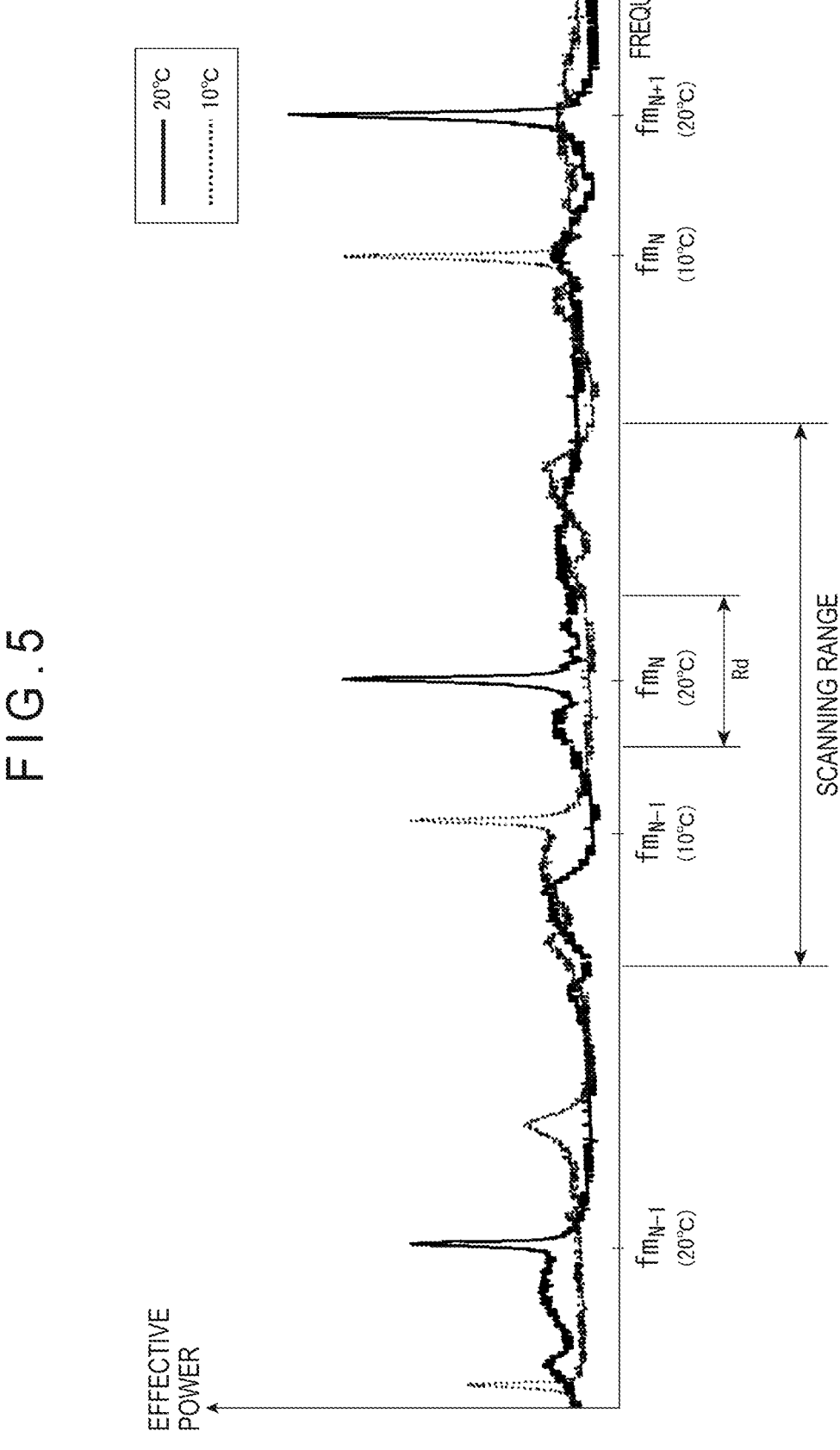
FIG. 5 is a graph illustrating, by way of example, a change in effective power of the liquid lens unit relative to the frequency of the drive signal in a target frequency band (the high frequency band), FIG. 5 illustrating a temperature change of the liquid lens unit.

FIG. 5 is a graph illustrating, by way of example, a change in the effective power P of the liquid lens unit 3 relative to the frequency of the drive signal Cf in the high frequency band. As illustrated in FIG. 5, a change in temperature of the liquid lens unit 3 in the high frequency band of the drive signal Cf causes a considerable change in the resonance frequency fm of the liquid lens unit 3. For instance, a resonance frequency $fm_{N-1}$ (10 degrees C.) of an order $m_{N-1}$ at 10 degrees C. is present near a resonance frequency $fm_N$ (20 degrees C.) of an order $m_N$ at 20 degrees C. Thus, not the resonance frequency $fm_N$ of the order $m_N$ but the resonance frequency $fm_{N-1}$ of the order $m_{N-1}$ is included within the scanning range depending on the temperature of the liquid lens unit 3, which may make it difficult to target and detect the resonance frequency $fm_N$ of the order $m_N$.

In the exemplary embodiment, the order m of the resonance frequency fm difficult to detect by the basic detection method for any of the above reasons is referred to as a hard-to-detect order. The hard-to-detect order is identified by an experiment or simulation with the liquid lens unit 3 and stored in advance as a hard-to-detect order list in the storage 64. Although the order m of the resonance frequency fm within the high frequency band is described above as the hard-to-detect order, the hard-to-detect order is not limited thereto.

Operation of Variable Focal Length Lens Device

Description will be made on an operation example of the variable focal length lens device 1 of the exemplary embodiment.

First, the drive controller 61 receives an input of the order m (hereinafter, a target order md) of a resonant mode specified by a user along with a start command for the liquid lens unit 3 from the lens operator 71 receiving a user operation. The drive controller 61 then determines whether or not the inputted target order $m_d$ is included in the hard-to-detect order list and detects, in a case where the target order $m_d$ is not included in the hard-to-detect order list, a resonance frequency $fm_d$ by the above basic detection method.

Figure 6:
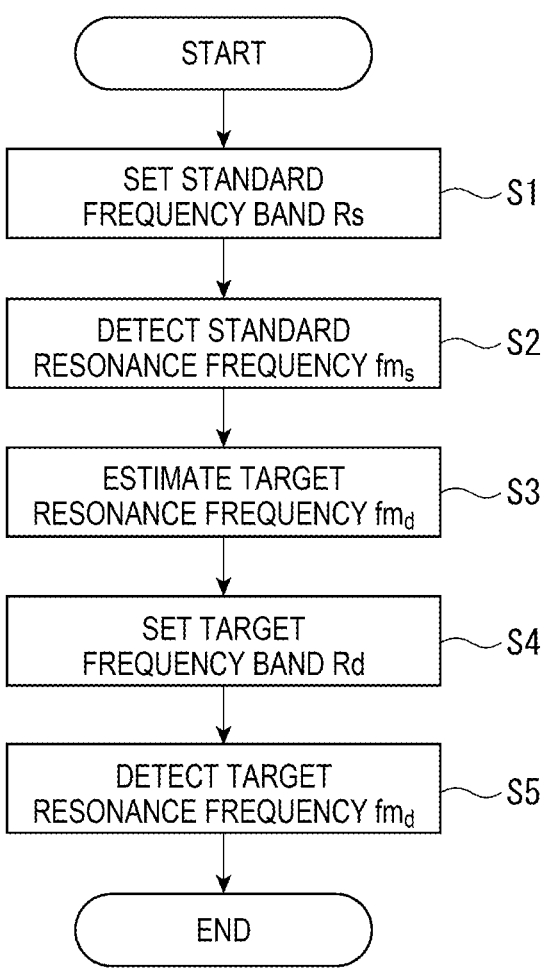
FIG. 6 is a flowchart illustrating an operation example of the variable focal length lens device of the exemplary embodiment.

In a case where the inputted target order $m_d$ is included in the hard-to-detect order list, the drive controller 61 detects the resonance frequency $fm_d$ by performing a flowchart illustrated in FIG. 6.

In the flowchart of FIG. 6, first, the scanning range setter 611 detects, by the basic detection method, not the inputted target order $m_d$, but a resonance frequency $fm_s$ of a predetermined order $m_s$ (hereinafter, standard order $m_s$) set in advance.

Specifically, the scanning range setter 611 sets a standard frequency band Rs corresponding to the standard order $m_s$ as a scanning range (Step S1). Here, the standard frequency band Rs is similar to the predetermined scanning range for the basic detection method as illustrated in FIG. 3. In other words, it is preferable that a target frequency band Rd, which is a frequency band set in advance by an experiment or simulation using the liquid lens unit 3, include the resonance frequency of the liquid lens unit 3 corresponding to a standard temperature and have a width that is approximately half as large as a resonance frequency interval of the liquid lens unit 3 (an interval between adjacent resonance frequencies).

The resonance frequency detector 612 then causes the frequency (the drive frequency) of the drive signal Cf to be scanned over the scanning range set in Step S1. At this time, after adjusting the drive frequency to a start position of the scanning range, the resonance frequency detector 612 performs sampling of the oscillation state Vf of the liquid lens unit 3 (for instance, the effective power P of the liquid lens unit 3) every time when changing (increasing or decreasing) the drive frequency by a predetermined amount. The resonance frequency detector 612 then detects a frequency at which the oscillation state Vf of the liquid lens unit 3 shows the maximum value as the resonance frequency $fm_s$ of the standard order $m_s$ (Step S2). Steps S1 to S2 correspond to a first detection step.

In the exemplary embodiment, the standard order $m_s$ in Step S1 is an order m that is not a hard-to-detect order, for instance, an order m (e.g., m=3) of the resonance frequency fm present in the low frequency band (less than 100 KHz). Further, the target order $m_d$ corresponding to a hard-to-detect order is, for instance, an order m (e.g., m=an integer of 6 or more) of the resonance frequency fm present in the high frequency band (100 KHz to 300 KHz).

Hereinafter, the resonance frequency $fm_s$ of the standard order $m_s$ is referred to as a standard resonance frequency $fm_s$ and the resonance frequency $fm_d$ of the target order $m_d$ is referred to as a target resonance frequency $fm_a$ in some cases.

Next, the resonance frequency estimator 614 calculates an estimated value of the target resonance frequency $fm_d$ on the basis of the standard resonance frequency $fm_s$ detected in Step S2 (Step S3; resonance frequency estimation step).

Figure 7:
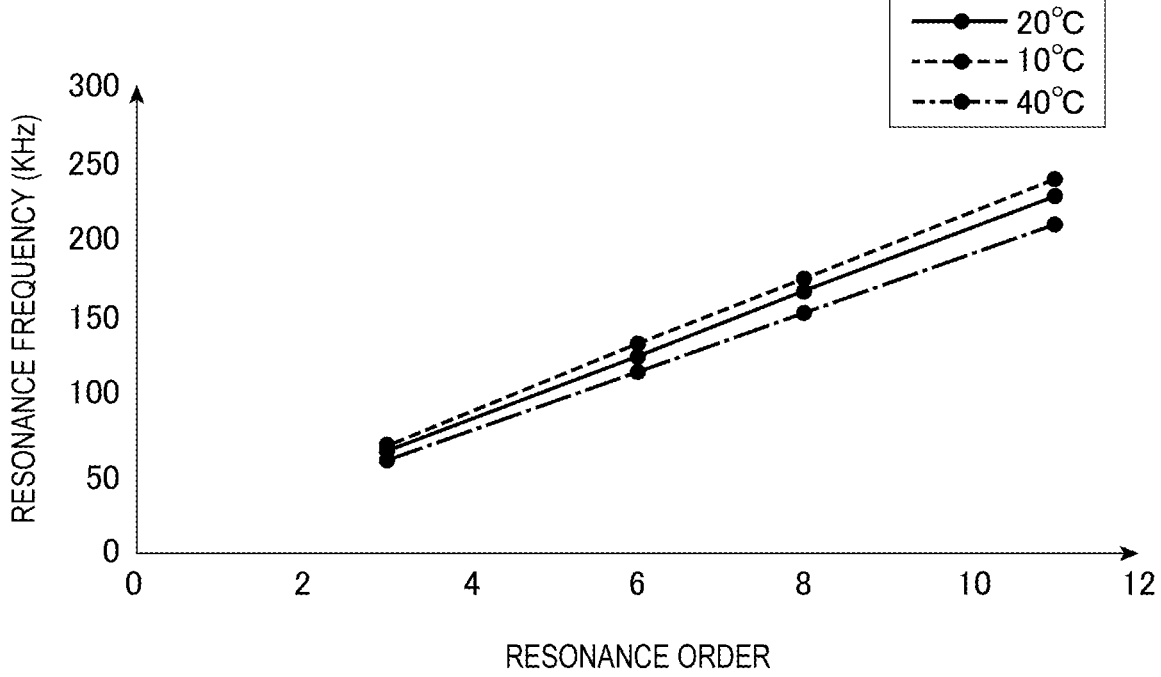
FIG. 7 is a graph illustrating a relationship between resonance frequency and resonance order of the liquid lens unit.

Here, the resonance frequency fm of the liquid lens unit 3 has a proportional relationship relative to the order m of the resonant mode as illustrated in FIG. 7. The resonance frequency estimator 614 can thus calculate the estimated value of the target resonance frequency $fm_d$ from the standard resonance frequency $fm_s$ by using a computing expression or a table using the proportional relationship.

For instance, on the basis of the proportional relationship illustrated in FIG. 7, the standard resonance frequency $fm_s$ is represented by Expression (1) below and the target resonance frequency $fm_d$ is represented by Expression (2) below.

$$fm_s = A \times m_s + B \qquad \text{Expression (1)}$$

$$fm_d = A \times m_d + B \qquad \text{Expression (2)}$$

According to above Expressions (1) and (2), the target resonance frequency $fm_a$ is represented by Expression (3) below.

$$fm_d = \frac{(m_d + \alpha)}{(m_s + \alpha)} \times fm_s \qquad \text{Expression (3)}$$

$\alpha$ in above Expression (3) is B/A, which is a value obtained by an experiment or simulated calculation using the liquid lens unit 3. The resonance frequency estimator 614 can calculate the estimated value of the target resonance frequency $fm_d$ by calculating above Expression (3).

A and B in above Expressions (1) and (2), which depend on temperature, correlate with each other and B/A is constant with respect to temperature. In other words, $\alpha$ in above Expression (3) is constant with respect to temperature.

Next, the scanning range setter 611 sets the target frequency band Rd corresponding to the target order $m_d$ as the scanning range on the basis of the estimated value of the target resonance frequency $fm_d$ calculated in Step S3 (Step S4). Here, it is only necessary for the target frequency band Rd to be a frequency band including the estimated value of the target resonance frequency $fm_d$ calculated in Step S3. Further, it is preferable that the target frequency band Rd be a range centered on the estimated value of the target resonance frequency $fm_d$ and have a width that is one quarter as large as or smaller than a resonance frequency interval (an interval between adjacent resonance frequencies) at a standard temperature. Alternatively, a difference (a frequency width) between the target resonance frequency $fm_d$ and a frequency of the spurious peak may be obtained in advance by an experiment or simulation with the liquid lens unit 3 at a standard temperature, and the target frequency band Rd may have the frequency width.

The resonance frequency detector 612 then causes the frequency (the drive frequency) of the drive signal Cf to be scanned over the scanning range set in Step S4. At this time, after adjusting the drive frequency to a start position of the scanning range, the resonance frequency detector 612 performs sampling of the oscillation state Vf of the liquid lens unit 3 (for instance, the effective power P of the liquid lens unit 3) every time when changing (increasing or decreasing) the drive frequency by a predetermined amount. The resonance frequency detector 612 then detects a frequency at which the oscillation state Vf of the liquid lens unit 3 shows the maximum value as the target resonance frequency $fm_d$ (Step S5). Here, a scanning pitch of the drive frequency in the scanning range (i.e., a sampling pitch of the oscillation state Vf of the liquid lens unit 3 relative to a change in the drive frequency) is preferably smaller than the scanning pitch in Step S2.

Steps S4 to S5 correspond to a second detection step.

Thereby, the flowchart in FIG. 6 ends

After that, the drive controller 61 starts to transmit, to the liquid lens unit 3, the drive signal Cf adjusted in accordance with a detected value of the target resonance frequency $fm_d$ detected in the flowchart of FIG. 6. This forms a standing wave of the resonant mode of the target order $m_d$ in the liquid lens unit 3, bringing the liquid lens unit 3 into a working state.

After the start of the liquid lens unit 3, the resonance-lock controller 615 causes the frequency of the drive signal Cf to follow the target resonance frequency $fm_d$ on the basis of the oscillation state Vf of the liquid lens unit 3. Refer to JP 2018-189700 A for specific operations of the resonance-lock controller 615.

Effects of the Exemplary Embodiment

In the variable focal length lens device 1 of the exemplary embodiment described above, in detecting the target resonance frequency $fm_d$ in the liquid lens unit 3, it is possible to set the target frequency band Rd including the estimated value of the target resonance frequency $fm_d$ as the scanning range of the frequency of the drive signal Cf as described above. This makes it possible to reliably detect the target resonance frequency $fm_d$ from the scanning range without securing a large width of the scanning range for detecting the target resonance frequency $fm_d$.

For instance, in the example illustrated in FIG. 4, the target frequency band Rd as the scanning range is a narrow range that is necessary and sufficient to include the peak Pb but not the spurious peak Ps. In the example illustrated in FIG. 5, the target frequency band Rd as the scanning range is an appropriate range including the target resonance frequency $fm_d$ (e.g., the frequency $fm_N$ (20 degrees C.)) irrespective of the temperature of the liquid lens unit 3. As a result, in each of the examples illustrated in FIGS. 4 and 5, it is possible to reliably detect the target resonance frequency $fm_d$ from the target frequency band Rd.

In the exemplary embodiment, the width of the target frequency band Rd is narrower than the width of the standard frequency band Rs. Such a configuration makes it possible to favorably achieve reliably detecting the standard resonance frequency $fm_s$ by securing the wide standard frequency band Rs and setting the target frequency band Rd in a range including no frequency at which a spurious peak or the like appears by narrowing the target frequency band Rd.

In the exemplary embodiment, the width of the target resonance frequency $fm_d$ is preferably one quarter as large as or smaller than the resonance frequency interval of the liquid lens unit 3 corresponding to a standard temperature. This makes it possible to favorably narrow the target resonance frequency $fm_d$.

In the exemplary embodiment, it is preferable that the scanning pitch of the drive signal Cf in the first detection process be larger than the scanning pitch of the drive signal Cf in the second detection process. In the first detection process, since it is less need to detect the standard resonance frequency $fm_s$ with high accuracy, there is no problem even if the scanning pitch is set rough. Further, setting the scanning pitch in the first detection process rough makes is possible to shorten time required for the first detection process. Furthermore, the scanning pitch in the second detection process is smaller than the scanning pitch in the first detection process, which makes it possible to detect the target resonance frequency with high accuracy.

Modifications

The invention is not limited to the above exemplary embodiment and modifications and the like are within the scope of the invention, provided that the object of the invention is achievable.

In the exemplary embodiment, the temperature estimator 613 may calculate the estimated temperature of the liquid lens unit 3 on the basis of the standard resonance frequency $fm_s$ detected in Step S2. In this case, in setting the target frequency band Rd as the scanning range in Step S4, the scanning range setter 611 may adjust the width of the target frequency band Rd depending on the estimated temperature. For instance, since an inclination of the resonance frequency fm relative to the resonance order increases with a decrease in temperature as illustrated in FIG. 7, the width of the target frequency band Rd may be reduced with an increase in the estimated temperature.

Further, in the exemplary embodiment, the width of the target frequency band Rd is not necessarily smaller than the width of the standard frequency band Rs and may be equivalent to or larger than the width of the standard frequency band Rs.

In the exemplary embodiment, the flowchart in FIG. 6 is to be performed in a case where the inputted target order $m_d$ is included in the hard-to-detect order list. The invention, however, is not limited thereto. For instance, the flowchart in FIG. 6 may be uniformly performed irrespective of the target order $m_d$. Here, the target order $m_d$ may be the same as the standard order $m_s$. In this case, the scanning pitch of the drive signal Cf in the first detection process is set rough and the scanning pitch of the drive signal Cf in the second detection process is set fine, which makes it possible to detect the target resonance frequency with high accuracy and shorten time required for the detection.

In the exemplary embodiment, the scanning pitch of the frequency of the drive signal Cf in the first detection step is not necessarily larger than the scanning pitch of the frequency of the drive signal Cf in the second detection step and may be equal to or less than that scanning pitch.

The variable focal length lens device 1 of the exemplary embodiment is a device that detects an image of the surface of the measurement target 9 placed in the imaging region; however, the invention is not limited thereto. For instance, the variable focal length lens device of the invention may be configured as a displacement gauge, a laser device, or the like using a change in focal length.

What is claimed is:

1. A variable focal length lens device comprising:
    a liquid resonant liquid lens unit having a refractive index changeable in response to an inputted drive signal;
    a scanning range setter configured to set a predetermined standard frequency band as a scanning range of a frequency of the drive signal;
    a resonance frequency detector configured to cause the frequency of the drive signal to be scanned over the scanning range and detect a resonance frequency of the liquid lens unit based on an oscillation state of the liquid lens unit; and
    a resonance frequency estimator configured to calculate an estimated value of a target resonance frequency of the liquid lens unit based on a standard resonance frequency that is a resonance frequency detected from the standard frequency band by the resonance frequency detector, wherein
    the scanning range setter is configured to further set a target frequency band including the estimated value of the target resonance frequency as the scanning range.

2. The variable focal length lens device according to claim 1, wherein a width of the target frequency band is narrower than a width of the standard frequency band.

3. The variable focal length lens device according to claim 1, wherein a width of the target frequency band is one quarter as large as or smaller than a resonance frequency interval of the liquid lens unit corresponding to a standard temperature.

4. A variable focal length lens control method, the method being applicable to a variable focal length lens device comprising a liquid resonant liquid lens unit having a refractive index changeable in response to an inputted drive signal, the method comprising:

(a) causing a frequency of the drive signal to be scanned over a predetermined standard frequency band and detecting a standard resonance frequency of the liquid lens unit based on an oscillation state of the liquid lens unit;

(b) calculating an estimated value of a target resonance frequency of the liquid lens unit based on the standard resonance frequency detected in the (a); and (c) causing the frequency of the drive signal to be scanned over a target frequency band including the estimated value of the target resonance frequency estimated in the (b) and detecting the target resonance frequency of the liquid lens unit based on an oscillation state of the liquid lens unit.

5. The variable focal length lens control method according to claim 4, wherein a scanning pitch of the frequency of the drive signal in the (a) is larger than a scanning pitch of the frequency of the drive signal in the (c).

* * * * *